(12) United States Patent
Kwon et al.

(10) Patent No.: US 12,023,686 B2
(45) Date of Patent: Jul. 2, 2024

(54) FILTER AND MANUFACTURING METHOD THEREOF

(71) Applicants: HYUNDAI MOTOR COMPANY, Seoul (KR); Kia Corporation, Seoul (KR); Seoul National University R&DB Foundation, Seoul (KR)

(72) Inventors: Dong Ho Kwon, Yongin-si (KR); Gee Young Shin, Suwon-si (KR); Myung Hoe Kim, Seoul (KR); Seung Sik Han, Hwaseong-si (KR); Seung Hwan Ko, Seoul (KR); Sung Geun Han, Seoul (KR); Jin Mo Kim, Seoul (KR)

(73) Assignees: HYUNDAI MOTOR COMPANY, Seoul (KR); Kia Corporation, Seoul (KR); Seoul National University R&DBFoundation, Seoul (KR)

( * ) Notice: Subject to any disclaimer, the term of this patent is extended or adjusted under 35 U.S.C. 154(b) by 280 days.

(21) Appl. No.: 17/412,935

(22) Filed: Aug. 26, 2021

(65) Prior Publication Data
US 2022/0203379 A1   Jun. 30, 2022

(30) Foreign Application Priority Data
Dec. 30, 2020   (KR) .......................... 10-2020-0188378

(51) Int. Cl.
*B03C 3/155*   (2006.01)
*B01D 46/00*   (2022.01)
(Continued)

(52) U.S. Cl.
CPC .......... *B03C 3/155* (2013.01); *B01D 46/0001* (2013.01); *B01D 46/0032* (2013.01);
(Continued)

(58) Field of Classification Search
CPC ................ B03C 3/155; B01D 46/0001; B01D 46/521–523; B01D 2239/0241;
(Continued)

(56) References Cited

U.S. PATENT DOCUMENTS 3,181,284 A * 5/1965 Copenhefer ............ B03C 3/155
96/67
2009/0078261 A1   3/2009 Martin et al.
(Continued)

FOREIGN PATENT DOCUMENTS

JP      2010-248996 A      11/2010
KR      10-0483105 B1      8/2005
(Continued)

*Primary Examiner* — Robert Clemente
(74) *Attorney, Agent, or Firm* — Lempia Summerfield Katz LLC

(57) ABSTRACT

A filter includes a dust collecting unit, and the dust collecting unit includes: a filter media formed in a wrinkle shape including a plurality of bent parts folded up and down in a direction parallel to a plurality of parallel patterns and a connection part; a conductive coating layer pattern including a plurality of parallel patterns; and a first power source electrically connected to a first end and a second end of the conductive coating layer pattern and configured to apply a voltage, wherein the connection part connects the adjacent bent parts, a parallel pattern of the plurality of parallel patterns is disposed in the connection part, and the plurality of parallel patterns includes a first and a second adjacent parallel patterns, and a first current flowing through the first adjacent parallel flows in a direction opposite to a second current flowing through the second adjacent parallel pattern.

12 Claims, 13 Drawing Sheets

(51) Int. Cl.
    *B01D 46/42*     (2006.01)
    *B01D 46/52*     (2006.01)
    *B03C 3/12*      (2006.01)
    *B03C 3/45*      (2006.01)

(52) U.S. Cl.
    CPC ....... *B01D 46/4245* (2013.01); *B01D 46/521* (2013.01); *B01D 46/523* (2013.01); *B03C 3/12* (2013.01); *B03C 3/45* (2013.01)

(58) Field of Classification Search
    CPC ........ B01D 2239/0471; B01D 46/0032; B01D 46/0034; B01D 46/4245; B01D 2239/10; B01D 2247/02
    See application file for complete search history.

(56) References Cited

U.S. PATENT DOCUMENTS

| | | | |
|---|---|---|---|
| 2017/0072406 A1* | 3/2017 | Yamaguchi | B01D 46/0032 |
| 2021/0291096 A1* | 9/2021 | Bergami | B01D 46/4263 |
| 2023/0067491 A1* | 3/2023 | Wang | B01D 53/885 |

FOREIGN PATENT DOCUMENTS

| | | | | |
|---|---|---|---|---|
| KR | 10-1580339 B1 | 12/2015 | | |
| WO | WO-2022010295 A1 * | 1/2022 | ......... | B01D 46/0001 |

* cited by examiner

FILTER AND MANUFACTURING METHOD THEREOF

CROSS-REFERENCE TO RELATED APPLICATION

This application claims priority to and the benefit of Korean Patent Application No. 10-2020-0188378, filed on Dec. 30, 2020, the entire contents of which are incorporated herein by reference.

FIELD

The present disclosure relates to a filter and a manufacturing method thereof.

BACKGROUND

The statements in this section merely provide background information related to the present disclosure and may not constitute prior art.

In general, a non-woven fabric filter or an electric dust collecting filter is applied to an air conditioning system.

In the case of a conventional non-woven fabric filter, it is desired to have a dense structure of the non-woven fabric filter in order to increase the dust collection efficiency because of a physical collection, and it causes a large pressure loss during an operation of the air conditioning system. In addition, as the dust collection rate increases, the space between the non-woven fabric fibers is narrowed by the collected dust, resulting in an increase in the pressure loss.

In order to improve such pressure loss, a method of increasing the area of the filter within a limited area by increasing the number of bent mountains of the filter is generally used. However, when the air conditioning system is operated, adhesion between the adjacent bent mountains occurs, thereby reducing the dust collection efficiency and increasing the pressure loss.

In order to inhibit such adhesion between the bent mountains, a method of fixing the filter fabric and inhibiting adhesion between the bent mountains is used by fixing the filter fabric by hot melt fixing, but an additional process is desired, and the fixing force of the filter fabric is deteriorated further from the hot melt.

In the case of the conventional electric dust collecting filter, the dust is collected by an electric force in the dust collecting unit by charging dust particles and forming an electric field, and this conventional electric dust collecting filter is still desired to have improved dust collecting efficiency.

The above information disclosed in this Background section is only for enhancement of understanding of the background of the present disclosure, and therefore it may contain information that does not form the prior art that is already known to a person of ordinary skill in the art.

SUMMARY

The present disclosure provides a filter and a manufacturing method, which may improve the conventional dust collecting filter, inhibit a reduction of a pressure and adhesion between bent mountains, and provide a dust collecting efficiency improvement.

A filter according to an exemplary form of the present disclosure relates to a filter including a dust collecting unit.

The dust collecting unit may include a filter media, a conductive coating layer pattern, and a first power source electrically connected to a first end and a second end of the conductive coating layer pattern and configured to apply a voltage.

The conductive coating layer pattern may include a plurality of parallel patterns, the filter media may be formed in a winkle shape including a plurality of bent parts folded up and down in a direction parallel to the plurality of parallel patterns, and a connection part connecting adjacent bent parts.

The parallel pattern may be disposed in the connection part, and currents of opposite directions to each other may flow between the adjacent parallel patterns.

The conductive coating layer pattern may be a pattern of a zigzag shape in which a plurality of parallel patterns are connected at offset positions from each other in the upper and lower parts of the conductive coating layer pattern.

When a voltage is applied to the conductive coating layer pattern, a repulsive force may act between the parallel patterns of adjacent connection parts.

The filter media may have a structure in which a plurality of fine fibers are randomly crossed.

The conductive coating layer pattern may be such that a conductive particle is attached on the fine fiber surface.

The conductive particle may be a conductive nanoparticle.

The conductive nanoparticle may be a conductive nanowire particle.

The conductive nanowire particle may have a thickness of 100 to 200 nm and a length of 150 µm or less.

A charging unit disposed in a front of the dust collecting unit and charging a dust particle may be further included.

The dust particles charged in the charging unit may be collected in the conductive coating layer pattern by an electric force and Van der Waals force.

A second power source electrically connected to the charging unit and configured to apply a high voltage may be further included.

A second power source electrically connected to the charging unit and the dust collecting unit and applying a high voltage may be further included.

The electric field may be generated by a voltage difference of the charging unit and the dust collecting unit.

The filter may be applied to an air conditioning device or an air conditioning system.

A filter manufacturing method according to an exemplary form of the present disclosure includes: alternately folding a filter media up and down and forming a wrinkle shape including a plurality of bent parts and a connection part connecting adjacent bent parts; forming a conductive coating layer pattern on the filter media; and electrically connecting a first end and a second end of the conductive coating layer pattern to a first power source.

In forming the conductive coating layer pattern on the filter media, the conductive coating layer pattern may include a plurality of parallel patterns and a parallel pattern among the plurality of parallel patterns may be formed to be positioned on the connection part.

The conductive coating layer pattern may be a pattern of a zigzag shape in which a plurality of parallel patterns are connected to be mismatched from each other in the upper and lower parts of the conductive coating layer pattern.

The filter media may have a structure in which a plurality of fine fibers are crossed.

Conductive particles may be attached to a surface formed by the plurality of fine fibers and form a conductive coating layer pattern.

Before forming the conductive coating layer pattern on the filter media, manufacturing a conductive nanowire solution, and cleansing the conductive nanowire surface, may be further included.

The conductive coating layer pattern on the filter media may be formed by spray coating.

Forming the conductive coating layer pattern on the filter media may be performed two times or more.

The filter media may have a structure in which a plurality of fine fibers are randomly crossed, and the conductive coating layer pattern may be such that the conductive particle is attached on the fine fiber surface.

The conductive particle may be a conductive nanowire particle.

The conductive nanowire particle may have a thickness of 100 to 200 nm.

The conductive nanowire particle may have a length of 150 μm or less.

It is possible to provide the filter and the manufacturing method thereof for inhibiting a reduction of a pressure loss and adhesion between bent mountains in addition to improving the dust collecting efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
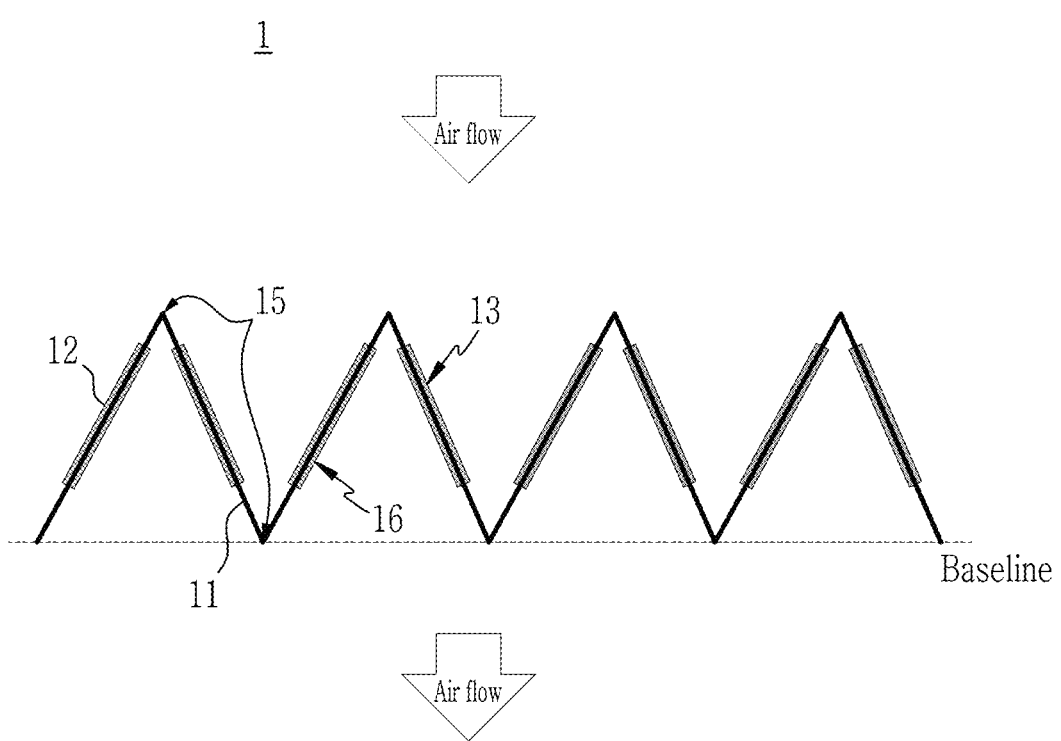
FIG. 1 is a schematic view showing a structure of a filter according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, unless explicitly described to the contrary, the word "comprise", and variations such as "comprises" or "comprising", will be understood to imply the inclusion of stated elements but not the exclusion of any other elements.

The terms of a singular form may include plural forms unless referred to the contrary.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Further, throughout the specification, "on" implies being positioned above or below a target element, and does not imply being necessarily positioned on the top on the basis of a gravity direction.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section.

Although not specifically defined, all of the terms including the technical and scientific terms used herein have meanings understood by ordinary persons skilled in the art.

The filter of the present disclosure may improve a fine dust collecting efficiency and simultaneously improve a pressure loss deteriorated problem, and inhibit adhesion between bent mountains.

Hereinafter, a filter and a manufacturing method thereof according to the present disclosure are described in detail.

Filter

A filter according to an exemplary form of the present disclosure includes a filter media, a conductive coating layer pattern, and a dust collecting unit including a first power source electrically connected to the conductive coating layer pattern to apply a voltage.

The conductive coating layer pattern may include a plurality of parallel patterns.

The filter media may have a wrinkle shape composed of a bent part folded up and down in a direction parallel to the parallel pattern, and a connection part connecting adjacent bent parts. The bent part may be a "∧" shape or a "⊓" shape, but is not limited thereto.

The parallel pattern may be positioned on the connection part.

Currents in opposite directions may flow through the adjacent parallel patterns. In this case, as a repulsive force is generated between the adjacent parallel patterns by the currents flowing in the opposite directions, without a separate structure such as a hot melt fixing, and the adhesion between the adjacent bent parts or between the adjacent connection parts may be suppressed, thereby it is possible to maintain the wrinkle shape and improve the pressure loss of the filter.

FIG. 1 is a schematic view showing a structure of a filter according to an exemplary form of the present disclosure.

As shown in FIG. 1, the parallel pattern may be positioned at the same height relative to the baseline.

The conductive coating layer pattern may be a pattern of a zigzag shape in which a plurality of parallel patterns are connected at the positions that are shifted from each other at the upper and lower portions. In this case, there is an advantage that the current between the adjacent parallel patterns may be designed to flow in the opposite directions by a simple electrical connection.

Figure 2:
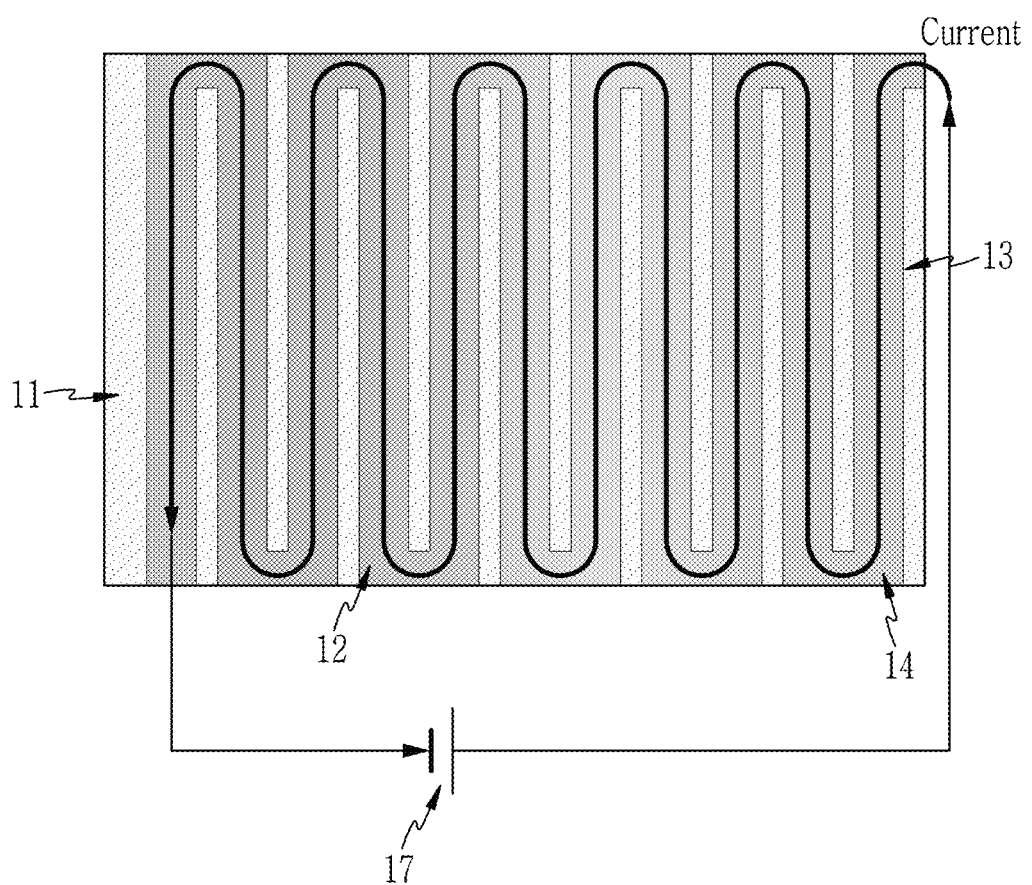
FIG. 2 is a view showing a conductive coating layer pattern formed on a filter media and a flow of a current when a voltage is applied to the conductive coating layer pattern.

FIG. 2 is a view showing a conductive coating layer pattern formed in a filter media and a flow of a current when applying a voltage to the conductive coating layer pattern. The conductive coating layer pattern includes a plurality of parallel patterns 13 and a connection pattern 14 connecting the adjacent parallel patterns at the mismatched positions in the upper and lower portions.

As shown in FIG. 2, the current flows in one direction in the form of the zigzag shape along the conductive coating layer pattern, and the current flows in the opposite directions to each other in the conductive coating layer patterns formed in the adjacent connection parts.

Figure 3A:
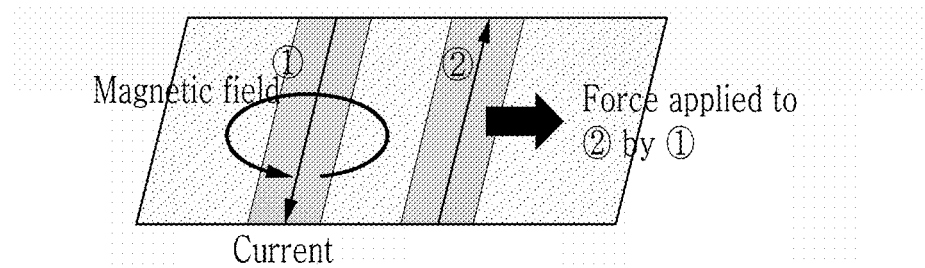
FIGS. 3A, 3B and 3C are views to explain a principle of a force acting between conductive coating layer patterns of adjacent connection parts.
Figure 3B:
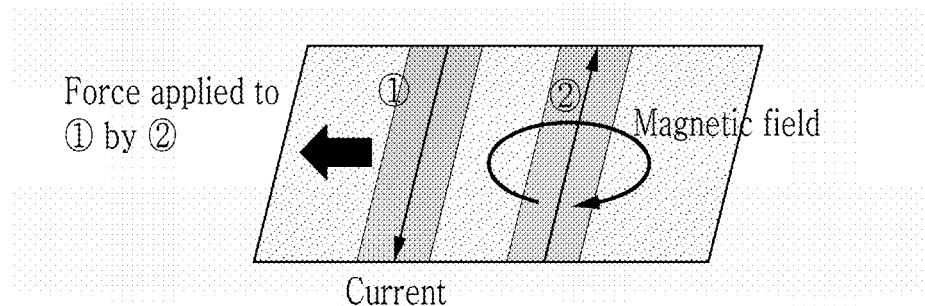
Figure 3C:
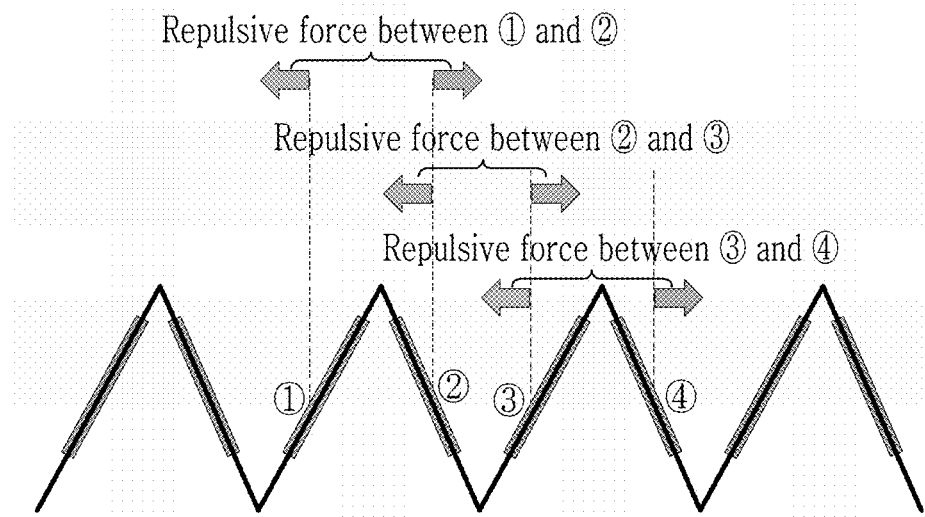

FIGS. 3A, 3B and 3C are views to explain a principle of a force acting between conductive coating layer patterns of adjacent connection parts. FIG. 3A shows a magnetic field generated in a first region and a force of a second region applied by the first region, FIG. 3B is a magnetic field generated in the second region and a force of the second region applied by the first region, and FIG. 3C shows a force acted between the parallel patterns of the adjacent connection parts.

When current flows in the opposite directions in the parallel patterns positioned in the adjacent connection parts, a repulsive force acts between the parallel patterns of two adjacent connection parts. Accordingly, it is possible to suppress the adhesion between the adjacent bent mountains of the filter media. That is, the filter in one form of the present disclosure maintains a gap between the bent parts without a separate structure such as hot melt fixing and may improve the pressure loss performance of the filter.

The conductive coating layer pattern may be disposed on the entire area of the thickness direction of the filter media, may be disposed on one surface of the filter media, and may be disposed on the partial area in the thickness direction on one surface of the filter media, and even in this case, it is possible to suppress the attachment between the bent mountains of the filter media.

The conductive coating layer pattern may be positioned on one surface of the filter media or may be positioned on a partial area in the thickness direction of one surface of the filter media. When the conductive coating layer pattern is positioned in the partial area in the thickness direction of one surface of the filter media, the conductive coating layer pattern may be positioned in front of the filter media.

In this specification, the front of the filter media refers to the first surface direction in which air enters when a surface where the air ingress is referred to as the first surface and a surface where the air exits is referred to as the second surface.

The filter media may be formed by crossing a plurality of fine fibers. Air may move through the space between a plurality of fine fibers.

If the space between the fine fibers is too narrow, the resistance of the air flow increases and then the pressure loss may increase.

The spacing between a plurality of fine fibers and the thickness of the fine fibers may be appropriately adjusted as desired in consideration of a use and the air resistance.

The filter media may be made of a non-woven fabric.

The filter media may apply polyester, polypropylene, and/or glass fibers.

Activated carbon may be added to the filter media, and in this case, an odor collecting effect may be improved.

If desired, a filter media to which an electrostatic force is artificially applied may be used, and in this case, initial performance of the filter may be improved.

However, it is not limited thereto, and can be applied in various ways as long as it is capable of collecting dust particles of a micro-unit size.

The conductive coating layer pattern may be formed by attaching conductive particles on a fine fiber surface configuring the filter media. In this case, since a coating layer may be formed without closing the space between a plurality of fine fibers, a reduction in the pressure loss may be reduced.

The conductive particle may be a conductive nanoparticle. In this case, there is an advantage in that the gap between a plurality of fine fibers is not closed and the conductive coating layer pattern may be obtained almost without affecting the gap between the fine fibers. In other words, the conductive coating layer patterns hardly affect the rough density of the filter media, so the pressure loss may be reduced.

The conductive nanoparticle may be applied without limitation as long as it is a nano-sized conductive material.

The conductive nanoparticle may be a conductive nanowire particle. In this case, due to a high aspect ratio of the nanowire, a mesh structure is formed, which facilitates an electrical connection and improves the conductivity.

The conductive nanoparticle may be a silver nanowire particle, a carbon nanowire, a gold nanowire, and/or a platinum nanowire. In this case, there is an advantage of having high conductivity, an antibacterial property, and corrosion resistance.

Figure 4:
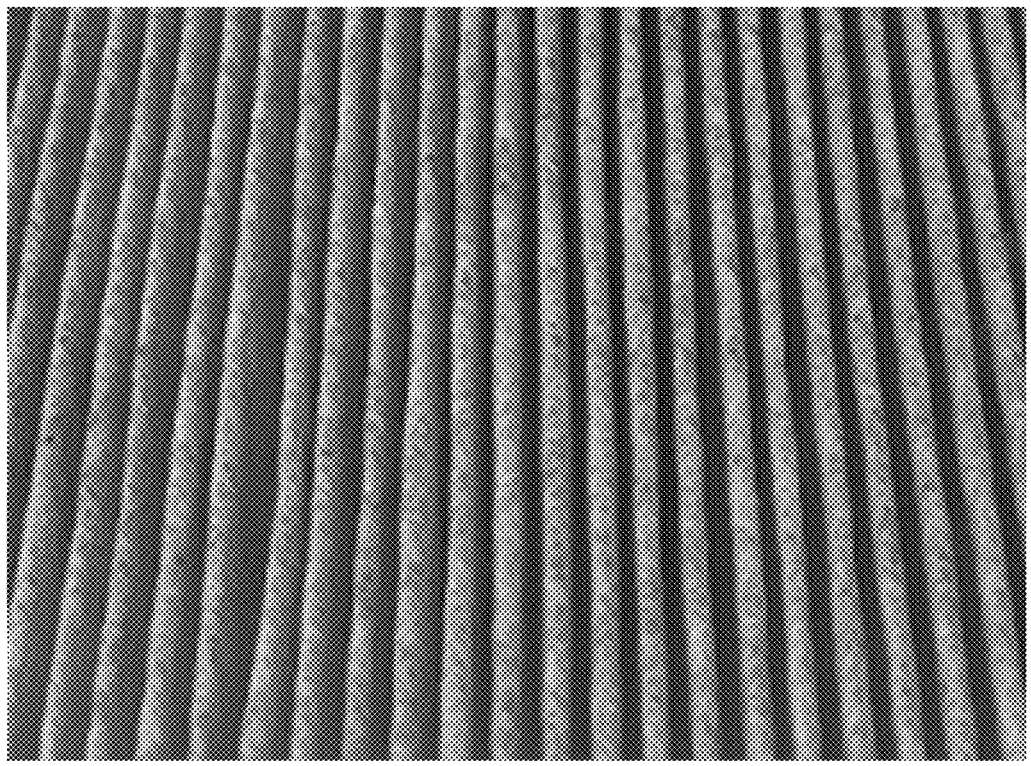
FIG. 4 is a photograph of a dust collecting unit of a filter in one form of the present disclosure.

FIG. 4 as a photograph of a dust collecting unit of a filter according to an exemplary form of the present disclosure is a photograph of a filter media in which a conductive coating layer pattern is formed.

Figure 5:
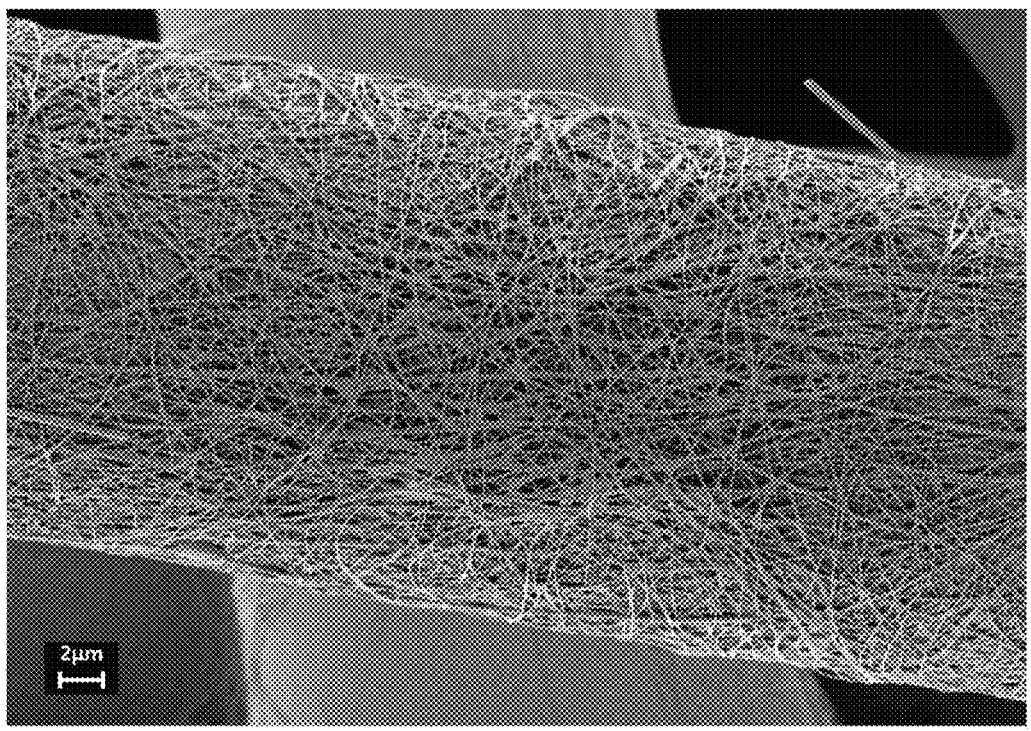
FIG. 5 is a SEM photograph of a dust collecting unit of a filter according to an exemplary form of the present disclosure.

FIG. 5 is a SEM photograph of a dust collecting unit of a filter according to another form of the present disclosure.

This indicates that a silver nanowire coating layer was formed on a non-woven fabric filter media composed of polypropylene and polyester. The filter media has a non-woven fabric structure in which microfibers are randomly crossed, and silver nanowires are attached to the microfiber surface to form a conductive coating layer. The silver nanowire has a thickness of about 100 nm and a length of about 70 μm.

The thickness of the conductive nanowire particle may be 100 to 200 nm. Specifically, it may be 120 to 150 nm.

If the thickness of the nanowire particles is too thick, the thickness of the conductive coating layer may become thick and the gap between the microfibers of the filter media may be narrowed, and accordingly, the pressure loss may increase when the air conditioning system is operated. If the thickness of the nanowire particles is too thin, it may be susceptible to damage due to low mechanical strength and chemical stability.

The conductive nanowire particle may have the length of 150 μm or less. In detail, it may be 140 μm or less, 120 μm or less, 20 to 150 μm, 20 to 140 μm, 40 to 140 μm, 80 to 140 μm, 100 to 140 μm, 120 to 140 μm, 40 to 120 μm, 40 to 100 μm, or 70 to 90 μm.

If the length of the nanowire particles is too long, impurities generated due to twisting between the nanowires may cause deterioration in the ease of the coating process and in quality.

If the length of the nanowire particle is too short, the contact point between the wires increases due to the low aspect ratio, and accordingly the electrical conductivity decreases due to the increase in the contact resistance.

Figure 12:
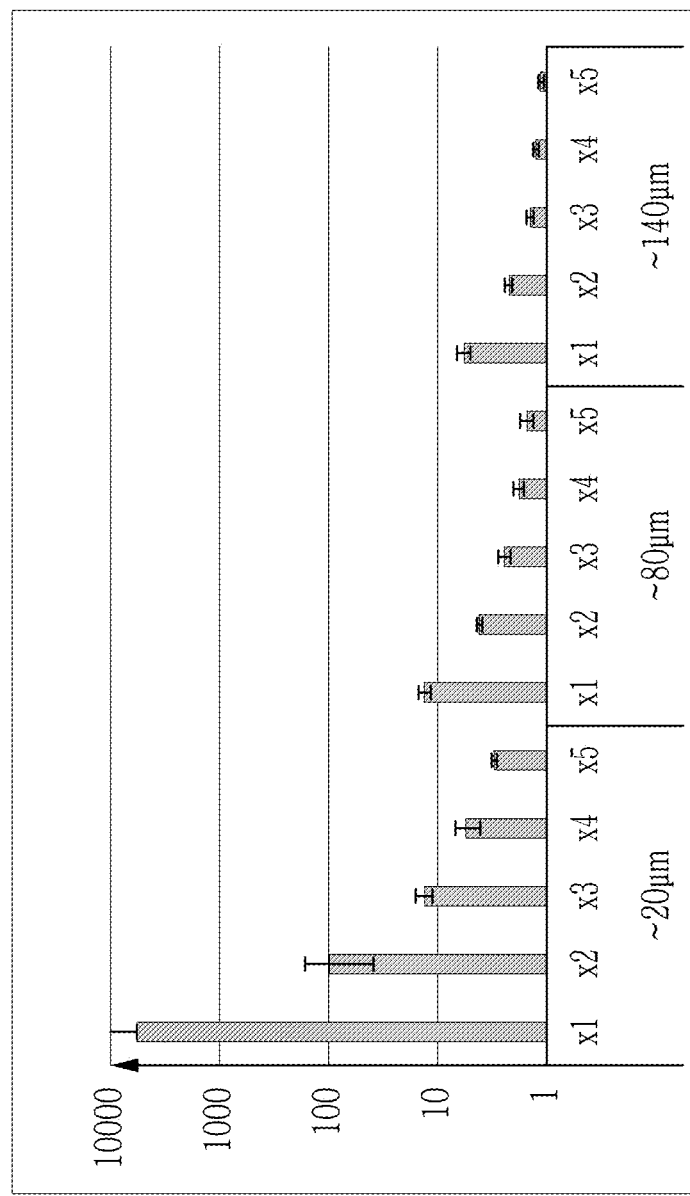
FIG. 12 is a graph showing a measured value of a sheet resistance according to the number of coatings per each nanowire length under a same weight coating condition.

FIG. 12 is a graph showing a measured value of a sheet resistance according to the number of coatings per each nanowire length under a same weight coating condition.

Referring to FIG. 12, it may be seen that a sheet resistance decreases when the length of the nanowire satisfies the range.

The width of the filter media connection part (i.e., the spacing between the adjacent bent parts) may be appropriately adjusted according to the size of the filter product and the pressure loss.

The width and the coating spacing L of the conductive coating layer pattern may be appropriately adjusted as desired in consideration of the width of the filter media connection part and the conductive coating layer pattern of the zigzag form.

Figure 6:
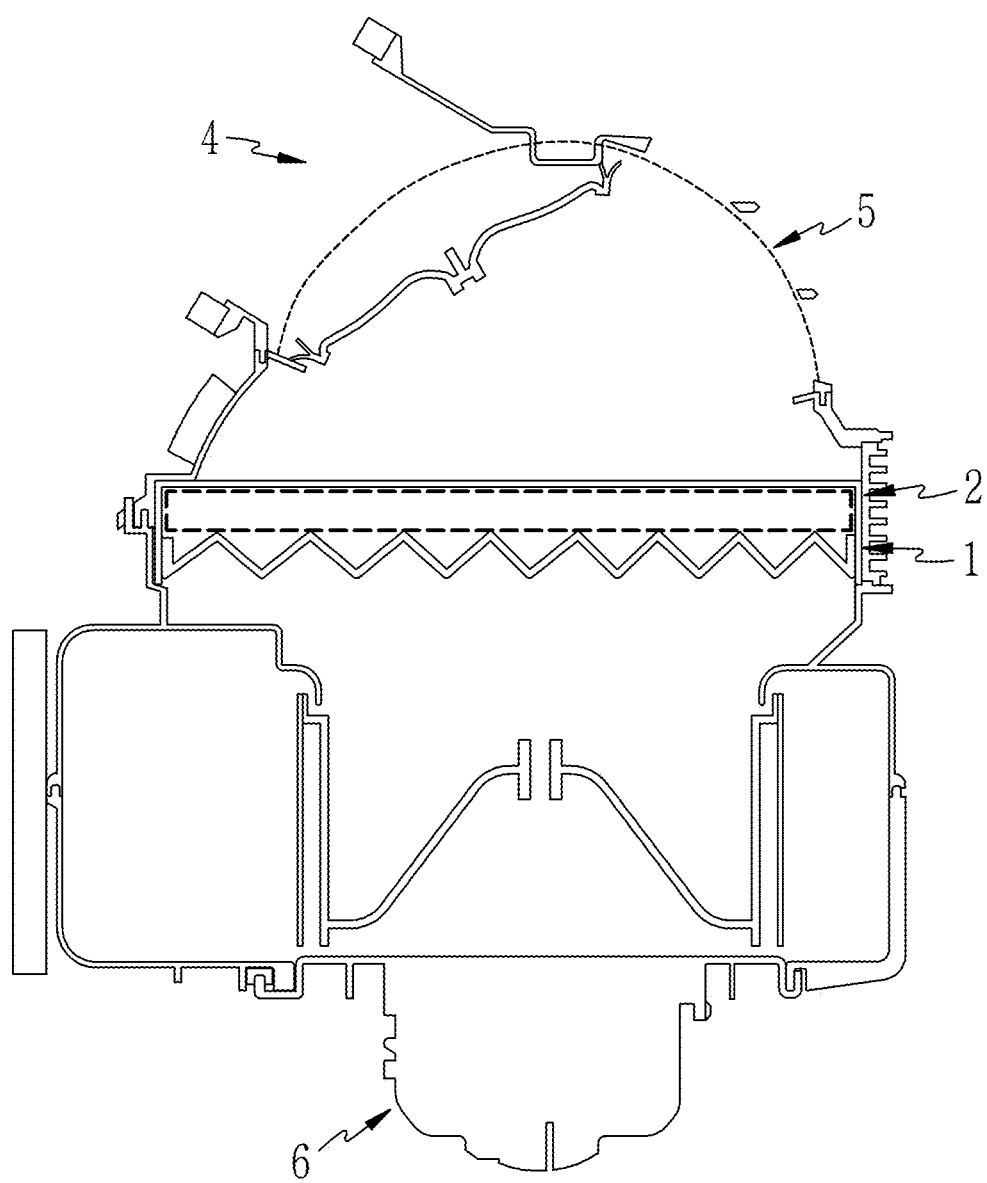
FIG. 6 is a view showing an air conditioning system to which a filter is applied according to another form of the present disclosure.

FIG. 6 is a schematic diagram showing a filter system to which a filter according to one form of the present disclosure is applied. Referring to FIG. 6, a structure in which an outdoor inflow part 4 and an indoor air inflow part 5 are positioned in the front of the charging unit 2 and the dust collecting unit 1 and a blower motor 6 is positioned at the rear is shown.

A filter according to another form of the present disclosure may include a charging unit positioned in front of the dust collecting unit and charging the dust particles inflowing from the outside.

In this specification, the front of the dust collecting unit means to be positioned on the first surface of the dust collecting unit when the air entering surface is referred to as the first surface, and the air exiting surface is referred to as the second surface and is used as a meaning including to be spaced apart and positioned on the first surface of the dust collecting unit.

Figure 7:
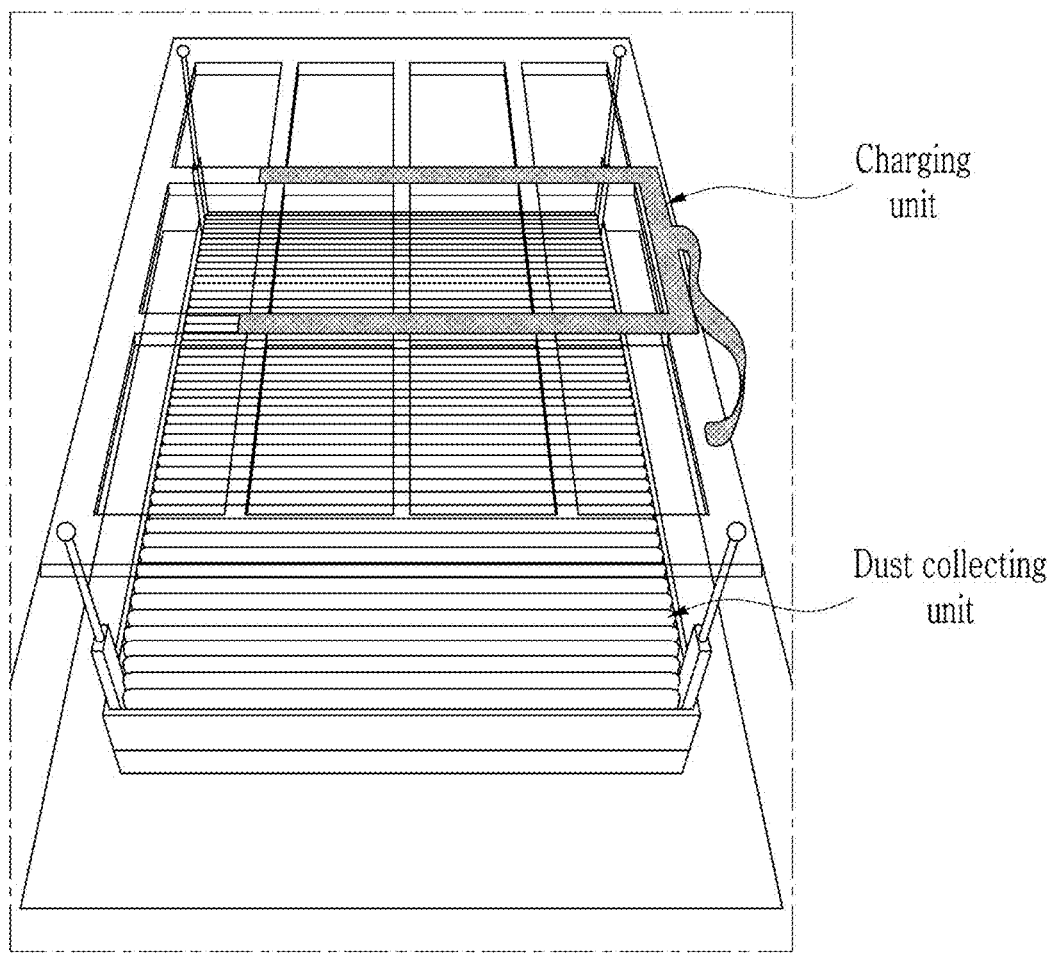
FIG. 7 is a filter photograph including a charging unit and a dust collecting unit according to an exemplary form of the present disclosure.

FIG. 7 is a filter photograph according to according to another form of the present disclosure. It may be seen that the filter according to another form of the present disclosure includes a charging unit spaced apart from and positioned in front of the current collector.

Figure 8:
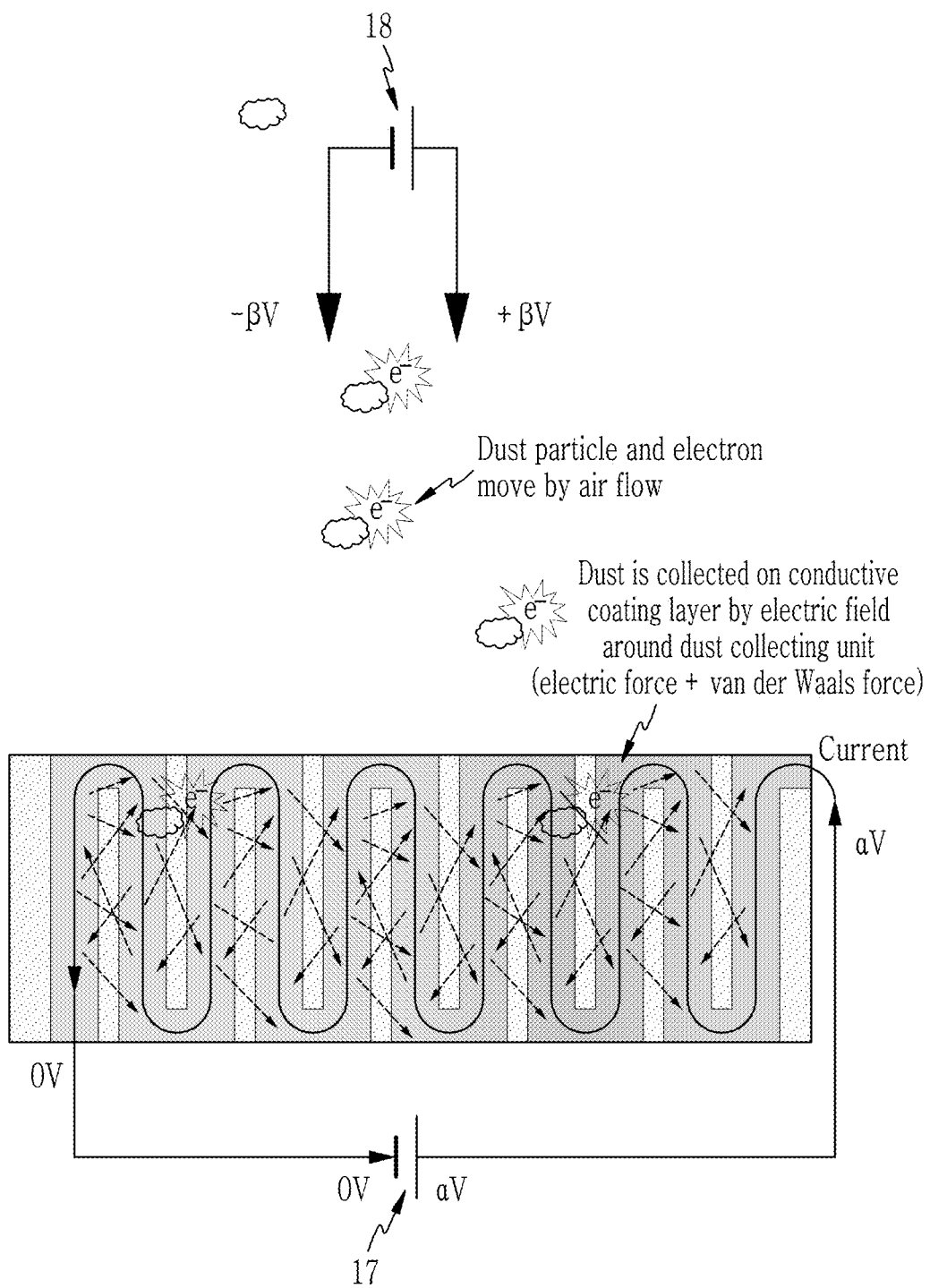
FIG. 8 is a view showing a dust collecting principle of a filter according to another form of the present disclosure.

FIG. 8 is a view showing a dust collecting principle of a filter according to another form of the present disclosure.

A second power source is a power source applying a high voltage.

The second power source is electrically connected to the charging unit, and the high voltage is applied to the charging unit through the second power source. Specifically, both a positive polarity and a negative polarity of the second power source may be connected to the charging unit.

The charging unit to which the high voltage is applied charges the inflowing dust, and the charged dust particles are moved by the air flow and then are attached to the conductive coating layer pattern by an electric force and a Van der Waals force by the electric field around the dust collecting unit.

Figure 9:
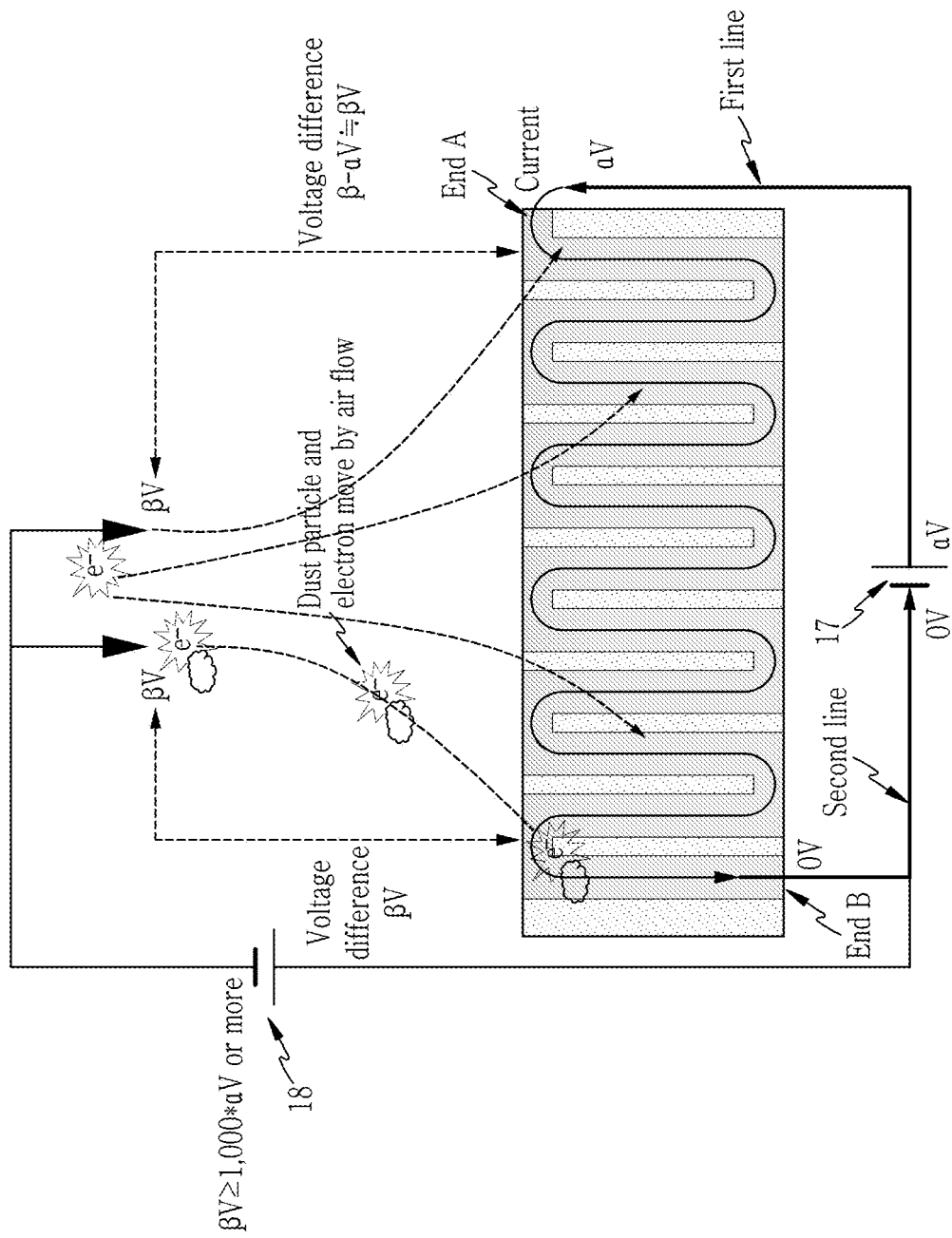
FIG. 9 is a view showing a dust collecting principle of a filter according to another form of the present disclosure.

FIG. 9 is a view showing a dust collecting principle of a filter according to another form of the present disclosure.

The second power source is electrically connected to the charging unit, and the dust collecting unit, and the electric field is generated by the voltage difference of the charging unit and the dust collecting unit.

The inflowed dust particles are charged in the charging unit, move by the electric field formed between the charging unit and the dust collecting unit, and are attached to the conductive coating layer pattern of the dust collecting unit with the electric force and Van der Waals force.

Specifically, the charging unit is connected to the negative polarity of the second power source, and the dust collecting unit is connected to the positive polarity of the second power source. In this case, the efficiency may be relatively improved. However, it is not limited thereto, and it is also possible to connect the charging unit to the positive polarity of the second power source and to connect the dust collecting unit to the negative polarity.

To explain the electrical connection between the second power source and the dust collecting unit, the electrical connection between the positive polarity of the first power source and one end A of the conductive pattern is referred to as the first line, and the electrical connection between the negative polarity of the first power source and the other end B of the conductive pattern is referred to as the second line.

The dust collecting unit may be electrically connected to the second power source on the first line or the second line. FIG. 9 shows the case that it is electrically connected to the second power source on the second line.

When the positive polarity voltage of the first power source is expressed as $\alpha V$ and the positive polarity voltage of the second power source is expressed as $\beta V$, the relationship between $\alpha$ and $\beta$ is $\beta V \geq 1000*\alpha V$, and a large voltage difference of $\beta V - \alpha V \approx \beta V$ is generated between the charging unit and the dust collecting unit.

The positive polarity voltage $\beta V$ of the second power source may be +1 kV to +3 kV. It may be +1 kV to +2 kV.

It is sufficient if the positive polarity voltage $\alpha V$ of the first power source is less than 220 V. In detail, it may be 50 to 220 V, 80 to 220 V, 100 to 200 V, 130 to 200 V, or 150 to 220 V.

A conventional electric dust collecting filter collects the dust by the electric force, but in the case of the filter according to the present disclosure, the dust collecting efficiency is improved because of collecting the dust by Van der Waals force along with the physical dust collecting and the electric force, and even if the power source is turned off, there is an advantage that the dust is not re-desorbed by the Van der Waals force.

This Van der Waals force is due to the attraction between the filter media and the conductive coating, and the dust particles. Van der Waals force is a force that basically acts between molecules, and when the dust particles are small, since the surface area for the volume is very large, a very large Van der Waals force acts, so the dust particles are stably attached.

In addition, since the filter of the present disclosure collects the dust by the electric force and Van der Waals force, even if the filter media having lower density than the conventional non-woven fabric filter is applied, the dust collecting efficiency may be improved and there is an advantage that there is little pressure loss according to the density of the filter media.

The charging unit may include at least one charging pin, and may charge the dust by a high voltage applied to the charging pin. The number and arrangement of the charging pins may be adjusted according to the dust collecting filter area, and the voltage applied to the charging pins may be adjusted according to a flow rate and a distance to the filter.

However, the present disclosure is not limited thereto, and the structure of the charging unit used in the art may be applied unless there are special circumstances.

The filter may have a collection rate of 40% or more of the particles of a size of more than 0.3 μm and less than 1 μm. In detail, it may be 40 to 99%, 45 to 99%, 50 to 99%, 54 to 99%, 40 to 95%, 45 to 95%, 50 to 95%, 54 to 95%, 40 to 90%, 45 to 90%, 50 to 90%, or 54 to 90%.

The filter may have a collection rate of 40% or more of the particles of a size of more than 0.3 μm and less than 0.5 μm. In detail, it may be 40 to 99%, 45 to 99%, 50 to 99%, 54 to 99%, 40 to 95%, 45 to 95%, 50 to 95%, 54 to 95%, 40 to 90%, 45 to 90%, 50 to 90%, 54 to 90%, 40 to 70%, 45 to 70%, 50 to 70%, 54 to 70%, 40 to 65%, 45 to 65%, 50 to 65%, or 54 to 65%.

The filter may have a collection rate of the particles of 40% or more of a size of more than 0.5 μm and less than 1 μm. In detail, it may be 40 to 99%, 45 to 99%, 50 to 99%, 54 to 99%, 40 to 95%, 45 to 95%, 50 to 95%, 54 to 95%, 40 to 90%, 45 to 90%, 50 to 90%, 54 to 90%, 60 to 99%, 60 to 95%, or 60 to 90%.

The filter may have a collection rate of 80 to 99.9% of the particles of a size of more than 5 μm and less than 10 μm. In detail, it may be 85 to 99.9%, 90 to 99.9%, 85 to 99%, or 90 to 99%.

The filter may have a collection rate of 80 to 99.9% of the particles of a size of more than 3 μm and less than 5 μm. In detail, it may be 85 to 99.9%, 90 to 99.9%, 85 to 99%, or 90 to 99%.

The filter may have a collection rate of 80 to 99.9% of the particles of a size of more than 5 μm and less than 10 μm. In detail, it may be 85 to 99.9%, 90 to 99.9%, 93 to 99.9%, 95 to 99.9%, 97 to 99.9%, 85 to 99%, 90 to 99%, 93 to 99%, 95 to 99%, or 97 to 99%.

The filter may be applied to an air purification device, an air filter, an air conditioning device, or an air conditioning system Next, a filter manufacturing method is described. The descriptions of the parts that overlap with the contents described in the filter above are omitted.

A Filter Manufacturing Method

Figure 10:
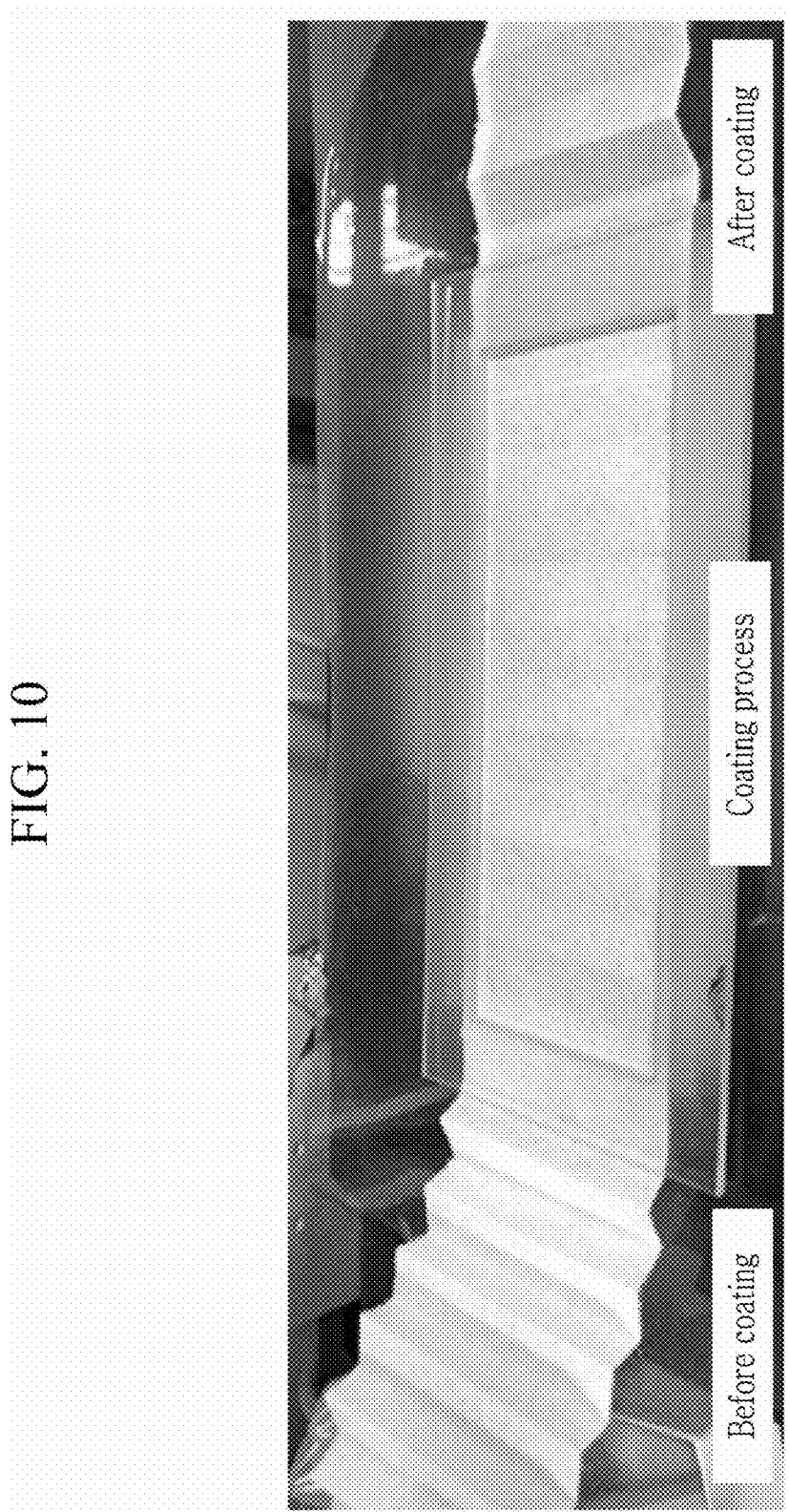
FIG. 10 is a view showing a filter manufacturing process according to an exemplary form of the present disclosure.

FIG. 10 is a photograph showing a filter manufacturing process according to an exemplary form of the present disclosure.

The filter manufacturing method in one form of the present disclosure includes a folding step of alternately folding a filter media up and down for forming a wrinkle shape, and a coating step of forming a conductive coating layer pattern on the filter media.

When the coating layer is formed after the folding step of the filter media, there is an advantage of reducing the damage of the coating layer of the bent part due to the folding of the filter media.

In the folding step, the filter media may be folded into a wrinkle shape composed of the bent part and the connection part connecting the adjacent bent parts. As described above, the bent part may be in the "∧" form or the "⊓" form.

In the coating step, the conductive coating layer pattern may include a plurality of parallel patterns.

The parallel pattern may be formed to be positioned on the connection part.

In the coating step, the conductive coating layer pattern may be a pattern of a zigzag shape in which a plurality of parallel patterns are connected to be mismatched from each other in the upper and lower portions.

After the coating step, an electrical connection step of electrically connecting the first power source to both ends of the conductive coating layer pattern may be further included.

In this case, as described above, when the voltage is applied to the conductive coating layer pattern, a repulsive force occurs between the parallel patterns of the adjacent connection parts, thereby inhibiting the adhesion between the bent mountains.

The coating step may be forming the conductive coating layer pattern by a method such as spray coating or dip coating. However, it is not limited thereto, and other coating methods may be applied as long as the pattern of the conductive coating layer pattern may be formed.

Specifically, the coating step may be performed by the spray coating method. In this case, by minimizing coating non-uniformity and minimizing resistance, there is an advantage of improving quality uniformity, maximizing an electrostatic force, and increasing the dust collecting efficiency. In addition, it is possible to form the conductive coating layer pattern on the filter media with little influence on the density of the filter media.

The coating step may be to perform coating more than once. Specifically, the coating may be performed 2 or more times, 2 to 5 times, or 2 to 4 times. In this case, the conductive coating layer pattern with very low sheet resistance may be formed. If the number of the coatings is too small, the sheet resistance of the formed conductive coating layer pattern may be high.

If the number of the coatings is too large, the effect of reducing the sheet resistance is not large, production cost increases, and process efficiency may decrease.

Figure 11A:
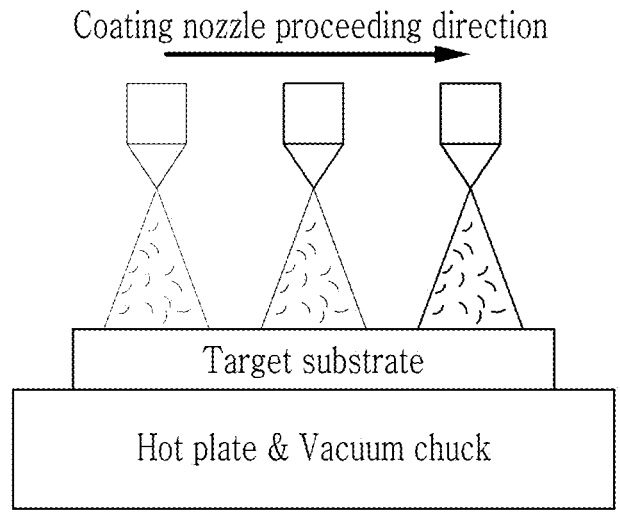
FIGS. 11A, 11B and 11C are views showing detailed conditions of a coating step in one form of the present disclosure.
Figure 11B:
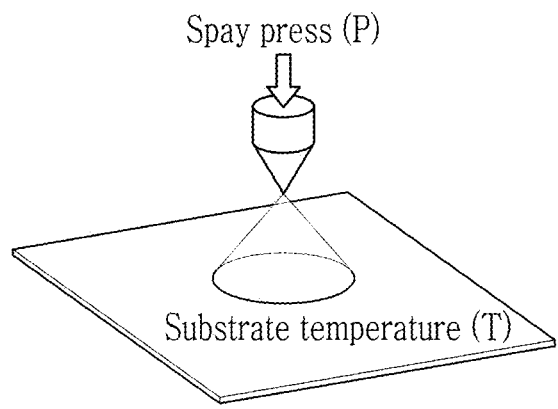
Figure 11C:
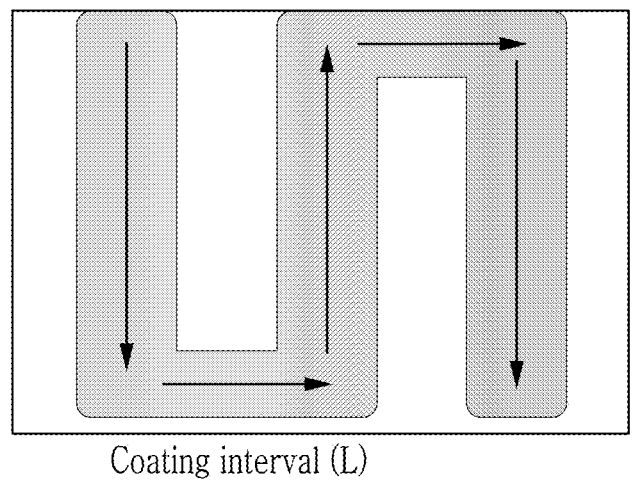

FIGS. 11A, 11B and 11C are views showing a detailed process of a coating step in one form of the present disclosure.

It may further include a step of preparing a conductive nanowire solution before the coating step.

The step of preparing the nanowire solution may be a step of preparing a silver nanowire solution.

In an exemplary form of the present disclosure, the step of preparing the silver nanowire solution is performed by a polyol process in which a silver salt is reduced by ethylene glycol under a presence of polyvinyl pyrrolidone (hereinafter, 'PVP'). Specifically, a solution was prepared by dissolving 0.8 g of PVP (with a molecular weight of 360,000) and 1 g of silver nitrate ($AgNO_3$) in 100 mL of ethylene glycol. Then, 3.6 mL of an ethylene glycol solution in which iron chloride ($FeCl_3$) is dissolved in a concentration of 2 mM is uniformly mixed in the above solution. Finally, the solution is heated in an oil bath at a temperature of 130° C. for 4 hours. In this process, due to the selective attachment of Cl or PVP on the {100} surface of silver nanoparticles, Ag attachment and growth on the {100} surface is suppressed, and nanowires are synthesized by being grown in the length direction.

The prepared conductive nanowire solution may be diluted in ethanol and centrifuged, thereby performing three or more steps of cleaning the conductive nanowire.

The following examples illustrate the present disclosure in more detail. However, the following form is only an exemplary form of the present disclosure and the present disclosure is not limited to the following form.

The filter media is alternately folded up and down to form a wrinkle shape consisting of the bent part and the connection part connecting the adjacent bent parts, and the conductive coating layer is formed on the filter media by the spray coating method.

The conductive coating layer forms the pattern of a zigzag shape in which a plurality of parallel patterns are connected at the positions that are mismatched from each other at the upper and lower portions, and the conductive coating layer pattern is formed so that the parallel pattern is positioned on the connection part of the filter media of the winkle shape.

Both ends of the conductive coating layer are electrically connected to the first power source, the charging unit is positioned to be spaced apart from the dust collecting unit in the front of the dust collecting unit and is connected to the second power source so that the charging unit applies the high voltage of the negative polarity, and the high voltage of the positive polarity is connected to the dust collecting unit to be configured like in FIG. 9.

The applied filter media is composed of polypropylene and polyester. As shown in FIG. 5, the conductive coating layer is a form in which the silver nanowire is attached to the fine fiber surface constituting the filter media, the thickness of the silver nanowire is about 100 nm, and the length of the silver nanowire is about 80 µm. The second power source applies −2 kV and 2 kV of the high voltage to the charging unit and the dust collecting unit, respectively, and the first power source is connected to both ends of the conductive coating layer pattern of the dust collecting unit to apply the voltage of approximately 200 V, and the dust collecting performance was evaluated.

Comparative Example

A comparative example uses the dust collecting unit without a conductive coating layer, and the dust collecting performance was evaluated with the same conditions as the form except for not including the charging unit.

Evaluation Example—a Dust Collecting Performance Evaluation Experiment of a Filter The dust collecting performance evaluation experiment of the filter according to an exemplary form of the present disclosure was performed.

Figure 13:
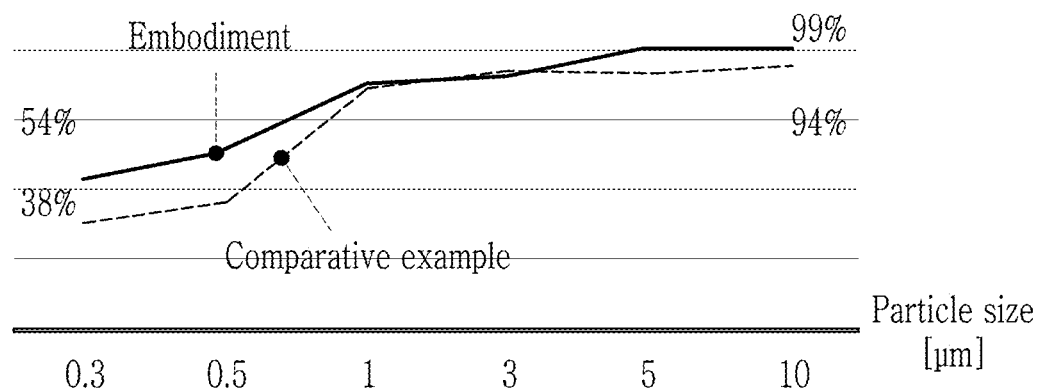
FIG. 13 is a graph estimating dust collecting performance of an exemplary form and a comparative example.

FIG. 13 is a graph of a collecting rate depending on a particle size of a filter according to an exemplary form and a comparative example.

As shown in FIG. 13, in the form, compared with the comparative example, the collecting performance is improved for the particle having the particle size of less than 1 µm and the particle size of more than 3 µm, and in general, it can be seen that the excellent collecting efficiency appears for ultra-fine dust, which has a very small size that is difficult to be collected.

Specifically, it was confirmed that the collection rate of the particle size of less than 1 µm is significantly improved to more than 54% in the case of the form compared to 38% in the comparative example. In addition, it may be seen that the collection rate of the particle exceeding 3 µm is also improved from 94% to 99%.

The present disclosure may be formed in many different forms, and should not be construed as being limited to the disclosed forms. In addition, it will be understood by those skilled in the art that various changes in form and details may be made thereto without departing from the technical spirit and essential features of the present disclosure. Therefore, it is to be understood that the above-described forms are for illustrative purposes only and the scope of the present disclosure is not limited thereto.

DESCRIPTION OF SYMBOLS 1 dust collecting unit 2 charging unit 4 outdoor air inflow part
5 indoor air inflow part 6 blower motor 11 filter media
12 conductive coating layer pattern 13 parallel pattern
14 connection pattern 15 bent part 16 connection part
17 first power source 18 second power source

What is claimed is:

1. A filter comprising a dust collecting unit, the dust collecting unit including:
   a filter media formed in a wrinkle shape including a plurality of bent parts folded up and down in a direction parallel to a plurality of parallel patterns and a connection part;
   a conductive coating layer pattern including the plurality of parallel patterns; and
   a first power source electrically connected to a first end and a second end of the conductive coating layer pattern and configured to apply a voltage,
wherein:
   the connection part connects adjacent bent parts among the plurality of bent parts,
   a parallel pattern of the plurality of parallel patterns is disposed in the connection part, and
   the plurality of parallel patterns include a first adjacent parallel pattern and a second adjacent parallel pattern, and a first current flowing through the first adjacent parallel flows in a direction opposite to a second current flowing through the second adjacent parallel pattern.

2. The filter of claim 1, wherein the conductive coating layer pattern is formed in a zigzag shape and the plurality of parallel patterns are connected at offset positions from each other in upper and lower parts thereof.

3. The filter of claim 1, wherein when a voltage is applied to the conductive coating layer pattern, a repulsive force acts between the plurality of parallel patterns.

4. The filter of claim 1, wherein the filter media includes a plurality of fine fibers that are randomly crossed, and
   the plurality of fine fibers form a surface to which a conductive particle is attached, the conductive particle forming the conductive coating layer pattern.

5. The filter of claim 4, wherein the conductive particle is a conductive nanoparticle.

6. The filter of claim 5, wherein the conductive nanoparticle is a conductive nanowire particle.

7. The filter of claim 6, wherein the conductive nanowire particle has a thickness of 100 to 200 nm and a length of 150 µpm or less.

8. The filter of claim 1, further comprising a charging unit disposed in a front of the dust collecting unit and configured to charge a dust particle.

9. The filter of claim 8, wherein the dust particle charged in the charging unit are collected in the conductive coating layer pattern by an electric force and Van der Waals force.

10. The filter of claim 9, further comprising a second power source electrically connected to the charging unit and configured to apply a high voltage.

11. The filter of claim 9, further comprising a second power source electrically connected to the charging unit and the dust collecting unit and configured to apply a high voltage,
wherein an electric field is generated by a voltage difference of the charging unit and the dust collecting unit.

12. The filter of claim 1, wherein the filter is configured to be applied to an air conditioning device or an air conditioning system.

* * * * *

UNITED STATES PATENT AND TRADEMARK OFFICE
CERTIFICATE OF CORRECTION

PATENT NO. : 12,023,686 B2  
APPLICATION NO. : 17/412935  
DATED : July 2, 2024  
INVENTOR(S) : Dong Ho Kwon et al.

Page 1 of 1

It is certified that error appears in the above-identified patent and that said Letters Patent is hereby corrected as shown below:

In the Claims

Column 12, Claim 7, Line 64 "µpm" should be replaced with "µm"

Signed and Sealed this
Eighth Day of October, 2024

Katherine Kelly Vidal
*Director of the United States Patent and Trademark Office*